United States Patent Office 3,484,384
Patented Dec. 16, 1969

3,484,384
CATALYTIC OXIDATION OF HYDROCARBONS
Ralph O. Kerr, Houston, Tex., assignor to Petro-Tex Chemical Corporation, Houston, Tex., a corporation of Delaware
No Drawing. Continuation-in-part of application Ser. No. 510,139, Oct. 21, 1963. This application Nov. 13, 1967, Ser. No. 682,645
Int. Cl. B01j 11/82
U.S. Cl. 252—437
2 Claims

ABSTRACT OF THE DISCLOSURE

Catalysts for vapor phase reactions characterized by combination of metallic elements including vanadium, phosphorus, copper, niobium and oxygen.

BACKGROUND OF THE INVENTION

This application is a continuation-in-part of my copending application Ser. No. 510,139, filed Oct. 21, 1963, now abandoned, which is a division of my application Ser. No. 274,349, filed Apr. 19, 1963, now U.S. Patent 3,255,212, which is in turn a continuation in part of my application Ser. No. 75,655, filed Dec. 14, 1960, now U.S. Patent 3,156,705, and application Ser. No. 75,680, filed Dec. 14, 1960, now U.S. Patent 3,156,706.

This invention relates to an improved process for the manufacture of dicarboxylic acid anhydrides by catalytic oxidation of ethylenically unsaturated hydrocarbons and relates more particularly to an improved process for producing monoethylenically unsaturated aliphatic dicarboxylic acid anhydrides such as maleic anhydride by reacting a mixture of an oxygen-containing gas and an ethylenically unsaturated hydrocarbon in vapor phase in the presence of a novel catalyst therefor.

Production of dicarboxylic acid anhydrides by vapor phase catalytic oxidation of hydrocarbons is well known. The principal method currently employed for making maleic anhydride is by the catalytic oxidation of benzene in the presence of certain heavy metal oxide catalysts. However, it would be desirable to be able to produce maleic anhydride from the readily available aliphatic hydrocarbons such as butene. Although processes for the oxidation of unsaturated aliphatic hydrocarbons are reported in the literature, there are certain defects of these processes such as short catalyst life and low yields of product. More efficient catalysts for the conversion of the hydrocarbons to maleic anhydride are desirable.

In copending applications I have described improved catalysts for the production of maleic anhydride from olefins. These catalysts comprise vanadium and phosphorus in particular ratios combined as a complex. The processes using the vanadium-phosphorus catalysts provide high yields of maleic anhydride as well as other advantages. However, it is a continuing object to improve these catalysts. One objective is to reduce the quantity of undesirable by-products such as acetic acid, propionic acid, acetaldehyde, acrolein, and crotonaldehyde. Another objective is to increase the life of these catalysts. Still another objective is to produce a catalyst which operates at a lower process temperature to produce maximum yields of product. Still another objective is to produce a catalyst which is stable under varying process conditions. Another objective is to provide a process wherein acid anhydrides may be produced at high flow rates in the reactor without deactivating the catalyst or causing the formation of undesirable by-products.

SUMMARY OF THE INVENTION

According to this invention an improved and novel catalyst in the oxidation of hydrocarbons to dicarboxylic acid anhydrides has been provided. These catalysts comprise a particular combination of vanadium, phosphorus, copper, and niobium combined as the oxides. The catalysts may also preferably contain an alkali metal. It has been found that the combination of copper and niobium is particularly effective in stabilizing phosphorus in the catalyst and producing a catalyst which will achieve the above described objectives. Even more effective is the combination of copper, niobium, and alkali metal as a stabilizer for the catalyst. The atomic ratio of the ingredients should be present in relative proportions of about one atom of vanadium to about 1.1 to 1.8 or 2.5 atoms of phosphorus, about 0.005 to 0.3 atom of copper per atom of vanadium and from about 0.005 to 0.25 atom of niobium per atom of vanadium. The preferred ratios are from 1.2 to 1.6 atoms of phosphorus, from about 0.04 to 0.20 atom of copper and from about 0.01 to 0.20 atom of niobium, based on the atoms of vanadium. The preferred catalysts will contain an element or compound thereof of metals of Group Ia of the Periodic Table.[1] The Group Ia elements are the alkali metals including lithium, sodium, potassium, rubidium, cesium and francium. The function of the Group Ia element is not completely understood but superior results are obtained when the catalyst contains these elements. One advantage is the life of the catalyst is increased with this increased life being due at least partially to the stabilizing effect of the alkali on the phosphorus and perhaps a stabilizing effect on the copper and niobium.

The atomic ratio of the total atoms of Group Ia elements to phosphorus should be between about 0.003 and 0.2 atom of Group Ia elements per atom of phosphorus. The best results have been obtained when the ratio of Group Ia atoms to phosphorus atoms has been about 0.01 to 0.06 or 0.1 atom of elements of Group Ia per atom of phosphorus. When the Group Ia atom is introduced into the catalyst preparation in the form of a compound, for example, as lithium hydroxide or potassium chloride, the weight of the Group Ia metal compound will ordinarily be from about 0.05 to about 5.0 weight percent of the total weight of the vanadium, phosphorus and oxygen.

The catalyst may be prepared in a number of ways. A preferred method to obtain catalysts which produce high yields of maleic anhydride upon oxidation of olefins is whereby the catalyst complex is formed in solution and deposited as a solution onto a carrier. According to one preferred solution method, the vanadium is present in solution with an average valence of less than plus 5 in the finally formed complex in solution. Preferably, the vanadium has an average valence of less than plus 5 at the time the solution of catalyst complex is deposited onto the carrier, if a carrier is used. Also preferably the complex is formed by reacting a solution of vanadium cations wherein the vanadium has a valence of about plus four with phosphorus which is contained in an anion such as $PO_4^{-3}$. The solution of vanadium cations may be obtained by reducing a compound such as $V_2O_5$ in a reducing solvent or by dissolving a compound such as vanadyl (IV) chloride. The vanadium compound may be dissolved in a reducing solvent, which solvent functions not only to form a solvent for the reaction, but also to reduce the valence of the vanadium compound to a valence of less than 5. For example, a vanadium compound, phosphorus compound, copper compound, and niobium compound may be dissolved in any order in a suitable reducing solvent and the formation of the complex allowed to take place. Preferably the vanadium compound is first dissolved in the solvent and thereafter the

[1] These groups are based on the long form of the Periodic Classification of the elements as found in Smith's Introductory College Chemistry, 3rd Edition, by William F. Ehret (Appleton-Century-Crofts, Inc., 1950).

phosphorus, copper, and niobium compounds are added. The reaction to form the complex may be accelerated by the application of heat. The deep blue color of the solution shows the vanadium has an average valence of less than 5, such as about 4. The complex formed is then, without a precipitation step, deposited as a solution onto a carrier and dried. In this preferred procedure, the vanadium has an average valence of less than plus 5 at the time it is deposited onto the carrier. Generally, the average valence of the vanadium will be between about plus 2.5 and 4.6 at the time of deposition onto the carrier, and preferably will be between 3.5 and 4.3.

The preferred catalysts are compositions having the prescribed ratios of vanadium, phosphate, copper and niobium, wherein the catalytic composition is deposited on a carrier with the vanadium being substantially in the form of a vanadyl phosphate. The average valence of the vanadium in the vanadyl radical will be less than plus 4.6. The vanadyl phosphate may be such as vanadyl orthophosphate, vanadyl hydrogen phosphate, vanadyl dihydrogen phosphate, hydrates thereof, and mixtures thereof. In these catalysts the vanadium should preferably be substantially or completely in the form of a vanadyl phosphate wherein the vanadium has an average valence of no greater than 4.3 such as about 4, at the time the catalytic composition is deposited on the carrier. The excess phosphorus, that is, the phosphorus which is not combined as the vanadyl phosphate may or may not be chemically combined with the niobium and copper at this time.

When the above described preferred solution method is employed, reducing agents for the vanadium may be either organic or inorganic. Acids such as hydrochloric, hydroiodic, hydrobromic acetic, oxalic, malic, citric, formic and mixtures thereof such as a mixture of hydrochloric and oxalic may be used. Sulphur dioxide may be used. Less desirably, sulfuric and hydrofluoric acids may be employed. Other reducing agents which may be employed, but which have not given as desirable catalysts are organic aldehydes such as formaldehyde and acetaldehyde; alcohols such as pentaerythritol, diacetone alcohol and diethanol amine, and additional reducing agents such as hydroxyl amines, hydrazine, and nitric oxide. The reducing solvents will preferably be aqueous solutions of aliphatic compounds of one to six carbon atoms, HCl, HBr, HI, or mixtures thereof. Nitric acid and similar oxidizing acids which would oxidize the vanadium from a valence of 4 to 5 during the preparation of the catalyst should be avoided. The reducing agents may form oxysalts of vanadium. For example, if $V_2O_5$ is dissolved in hydrochloric or oxalic acid, the corresponding vanadium oxysalts are produced. These vanadium oxysalts should have as the salt forming anion an anion which is more volatile than the phosphate anion.

The time at which the copper compound, niobium compound, and alkali compound, if included, is incorporated into the solution is not critical so long as it is in solution before the catalyst complex is coated onto the carrier. The copper and alkali compounds may be added after the vanadium compound and the phosphorus compound have been reacted or the copper and alkali compounds may be added either before, at the same time, or after either the vanadium or phosphorus compounds has been added. The alkali compound, niobium compound, and copper do not have to be added at the same time.

The catalyst complex containing vanadium, phosphorus, copper, and niobium may be formed by causing the combination of each of the ingredient components in a solution or dispersion. Heat may be applied to accelerate the formation of the complex and one method of forming the complex is by causing the ingredients to react under reflux conditions. Under reflux conditions this solution reaction generally takes about one or two hours.

Any vanadium, phosphorous, copper and niobium compounds may be used as starting materials which when the precursor compounds are combined according to the prescribed process and heated to dryness in air at a temperature of, for example, 350° C. will leave as a deposit a catalyst complex having relative atomic proportions within the above described ranges. Preferred are vanadium, phosphorus, copper and niobium compounds which are essentially completely soluble under standard conditions of 760 mm. of mercury in boiling aqueous hydrochloric acid, containing 37 weight percent hydrochloric acid. Generally, phosphorus compounds are used which have as the cation an ion which is more volatile than the phosphate anion. Various compounds may be used, such as metaphosphoric acid, triphosphoric acid, ortho-phosphoric acid, phosphorous pentoxide, phosphorous oxyiodide, ethyl phosphate, methyl phosphate, amine phosphate, phosphorous pentachloride, phosphorous trichloride, phosphorous oxybromide, and the like.

Suitable vanadium compounds useful as starting materials are compounds such as vanadium pentoxide, ammonium metavanadate, vanadyl chloride, vanadyl dichloride, vanadyl trichloride, vanadium sulfate, vanadium phosphate, vanadium tribromide, vanadyl formate, vanadyl oxalate, metavanadic acid, pyrovanadic acid, and the like. Generally, any vanadium compound which has an anion which is either the phosphate anion or is more volatile than the phosphate anion is satisfactory.

Suitable copper compounds are the various compounds such as the copper halides, phosphates, oxides, carbonates, sulfates, nitrates, acetates, hydrides, and so forth. Metallic copper may be used. Generally copper compounds are used which either have the phosphate anion as the anion or which have an anion which is more volatile than the phosphate anion. Copper compounds which are soluble in hydrochloric acid are preferred. Compounds such as cuprous oxide, cupric oxide, cuprous chloride, cuprous sulfate, cuprous or cupric sulfide, cupric lactate, cupric nitrate, cupric phosphate, cuprous bromide, cuprous carbonate, cupric sulfate, cupric oxychloride, cuprous hydroxide, cuprous sulfite, cupric acetate, and the like, are useful as starting materials. Mixtures of the various vanadium, phosphorus and copper compounds may be used as starting materials to form the described catalyst complex.

Suitable niobium compounds are the various compounds such as the niobium halides, phosphates, oxides, carbonates, sulfates, nitrates, acetates, and so forth. Generally, niobium compounds are used which either have the phosphate anion as the anion or which have an anion which is more volatile than the phosphate anion. Compounds such as niobium dioxide, niobium pentoxide, niobium oxychloride, niobium oxylate, and the like, are useful as starting materials. Mixtures of the various vanadium, phosphorus and niobium compounds may be used as starting materials to form the described catalyst complex.

The alkali metal may suitably be introduced by employing alkali metal compounds such as alkali metal salts with examples being lithium acetate, lithium bromide, lithium carbonate, lithium chloride, lithium hydroxide, lithium iodide, lithium oxide, lithium sulfate, lithium orthophosphate, lithium metavanadate, potassium sulfate, potassium chloride, potassium hydroxide, sodium chloride, sodium hydroxide, rubidium nitrate, cesium chloride and the like. Mixtures of two or more alkali metal compounds may be used, such as a mixture of lithium hydroxide and sodium chloride or a mixture of lithium chloride and potassium chloride. The preferred alkali metal elements are lithium, sodium and potassium, and mixtures thereof, with lithium being particularly preferred. The alkali metal compound will preferably be an alkali metal compound which either has a phosphate anion as the anion, that is a compound such as lithium phosphate, or a compound which has an anion which is more volatile than the phosphate anion.

Another example of the preparation of the catalyst complex is to dissolve the copper and niobium compounds and a vanadium compound such as ammonium metavanadate or vanadium pentoxide in an aqueous solution of phosphoric acid. After the components have been dissolved the solution is heated until precipitation occurs. The precipitant can then be dried and used as a catalyst or a carrier may be combined with the liquid phase either before or after the precipitation. These catalysts are superior to the unmodified vanadium-phosphorus catalysts but superior results are obtained when the preferred method described above is utilized.

Inert diluents such as silica may be present in the catalyst, but the combined weight of the vanadium, oxygen, phosphorus, copper, niobium, and alkali metal, if employed, should preferably constitute at least about 50 weight percent of the catalyst composition or surface exposed to the reaction gases, and preferably these components constitute at least about 75 weight percent of the catalyst surface and more preferably at least about 95 weight percent.

Although the catalysts may be separately formed and used as pellets, it is prefered to deposit this material on a carrier such as aluminum oxide or silica. Before the carrier is combined with the catalyst the solution of catalyst is preferably concentrated to a solution which contains from about 30 to 80 percent volatiles, and better results have been obtained when there is from about 50 to 70 percent volatiles by weight. The carrier may be added to the catalyst solution or dispersion or the catalyst solution or dispersion may be poured onto the carrier. Less desirably, the Alundum or other carrier may be present during the whole course of reactions to provide the desired vanadium-oxygen-phosphorus-copper-niobium complex. After the catalyst complex has been coated onto the carrier, the catalyst may be converted to a more active form by heating in the presence of an oxidizing gas.

The support or carrier for the vanadium-oxygen-phosphorus-copper-niobium complex, if a carrier is used, should preferably be inert to both the depositing solution containing the complex and preferably should be inert under the catalytic oxidation conditions. The support provides not only the required surface for the catalyst, but gives physical strength and stability to the catalyst material. The carrier or support normally has a low surface area, as usually measured, from about 0.001 to about 5 square meters per gram. A desirable form of carrier is one which has a dense non-absorbing center and a rough enough surface to aid in retaining the catalyst adhered thereto during handling and under reaction conditions. The carrier may vary in size but preferably is from about 2½ mesh to about 10 mesh in the Tyler Standard screen size. Alundum particles as large as ¼ inch are satisfactory. Carriers much smaller than 10 to 12 mesh normally cause an undesirable pressure drop in the reactor. Very useful carriers are Alundum and silicon carbide or Carborundum. Any of the Alundums or other inert alumina carriers of low surface may be used. Likewise, a variety of silicon carbides may be employed. Silica gel may be used. The amount of the catalyst complex on the carrier is usually in the range of from about 10 to about 30 weight percent of the total weight of complex plus carrier and more preferably from about 14 to about 24 weight percent on an inert carrier such as Alundum. The amount of the catalyst complex deposited on the carrier should be enough to substantially coat the surface of the carrier and this normally is obtained with the ranges set forth above. With more absorbent carriers, large amounts of material will be required to obtain essentialy complete coverage of the carrier. Excess catalyst over that required to coat the carrier surface is not necessary and usually will be lost by mechanical attrition. The final particle size of the catlyst particles which are coated on a carrier will also preferably be about 2½ to about 10 mesh size. The carriers may be of a variety of shapes, the preferred shape of the carriers is in the shape of cylinders or spheres. Although more economical use of the catalyst on a carrier in fixed beds is obtained, the catalyst may be employed in fluid bed systems. Of course, the particle size of the catalyst used in fluidized beds is quite small, varying from about 10 to about 150 microns and in such systems the catalyst normally will not be provided with a carrier but will be formed into the desired particle size after drying from solution. Therefore, the particle size may suitably range from about 10 microns to about ¼ inch or longer in the greatest dimension.

Prior to use, the catalytic material may be placed in the reactor used to convert an olefin such as butene-2 to maleic anhydride and may, for example, be conditioned by passing butene-2 in a low concentration of butene-2 in air over the catalyst. In a typical, but non-limiting, example the temperature may be slowly raised over a period of 72 hours, to about 350° C. or 550° C. Thereafter, butene-2 in air may be passed over the catalyst, for example, at a concentration of about 1.2 mol percent butene-2 at the rate of 100 grams butene-2 per liter of catalyst per hour and the maleic anhydride product collected from the gaseous effluent from the reactor. The reaction requires only passing the olefin in low concentrations in air over the described catalyst.

The flow rate of the gaseous stream through the reactor may be varied within rather wide limits, but a preferred range of operations is at the rate of about 50 to 300 grams of olefin per liter of catalyst per hour and more preferably about 100 to about 250 grams of olefin per liter of catalyst per hour. Residence times of the gas stream will normally be less than about 2 seconds, more preferably less than about 0.5 second. The residence time is the calculated dwell time in the reactor space, with the reactor space being defined as the void space portion of the reactor containing catalyst at a temperature of at least 350° C.

A variety of reactors will be found to be useful such as multiple tube heat exchanger type reactors or fluid bed reactors. If a tubular reactor is employed, the tubes of such reactors may conveniently vary in diameter from about ¼ inch to about 3 inches, and the length may be varied from about 3 to about 10 or more feet. The oxidation reaction is an exothermic reaction and, therefore, relatively close control of the reaction temperature should be maintained. It is desirable to have the surface of the reactors at a relatively constant temperature and some medium to conduct heat from the reactors is necessary to aid temperature control. Such media may be Woods metal, molten sulfur, mercury, molten lead, and the like, but it has been found that eutectic salt baths are completely satisfactory. One such salt bath is a sodium nitrate-sodium nitrite-potassium nitrate eutectic constant temperature mixture. An additional method of temperature control is to use a metal block reactor whereby the metal surrounding the tube acts as a temperature regulating body. As will be recognized by the man skilled in the art, the heat exchange medium will be kept at the proper temperature by heat exchangers and the like. The reactor or reaction tubes may be iron, stainless steel, carbon-steel, nickel, glass tubes such as Vycor [2] and the like. Both carbon-steel and nickel tubes have excellent long life under the conditions of the reactions described herein. Normally, the reactors contain a preheat zone of an inert material such as ¼ inch Alundum pellets, inert ceramic balls, metal balls or chips and the like. Conveniently the preheat zone will comprise about one-half to one-fourth the volume of the active catalyst present, although it is not essential to have any preheat zone.

The temperature of reaction may be varied within some limits, but normally the reaction should be conducted at temperatures within a certain range. The oxidation reaction is exothermic and once reaction is underway, the main purpose of the salt bath or other media

---

[2] Vycor is the trade name of Corning Glass Works, Corning, N.Y., and is composed of approximately 96 percent silica with the remaining being essentially $B_2O_3$.

is to conduct heat away from the walls of the reactor and control the reaction. Better operations are normally obtained when the reaction temperature employed is no greater than about 100° C. above the salt bath temperature, under a given set of conditions. The temperature in the reactor, of course, will also depend to some extent upon the size of the reactor and the olefin concentration. Under usual operating conditions, in compliance with the preferred procedure of this invention, the temperature in the center of the reactor, measured by thermocouple, is about 375° C. to about 550° C. The range of temperature preferably employed in the reactor, measured as above, should be from about 390° C. to about 515° C. and the best results are ordinarily obtained at temperatures from 400° C. to about 500° C. Described another way, in terms of salt bath reactors with carbon steel reactor tubes, about 1.0 inch in diameter, the salt bath temperature should be controlled between about 350° C. to about 550° C. Under normal conditions, the temperature in the reactor ordinarily should not be allowed to go above about 550° C. for extended lengths of time because of decreased yields and possible deactivation of the novel catalyst of this invention.

The pressure on the reactor is not generally critical, and the reaction may be conducted at atmospheric, superatmospheric or below atmospheric pressure, and conventiently will be at about atmospheric pressure.

The catalysts of the present invention and the process of using them are useful for the production of aliphatic dicarboxylic acid anhydrides from aliphatic hydrocarbons. Ethylenically unsaturated hydrocarbons of from 4 to 6 carbons atoms such as 3-methylbutene-1, isoprene, 2,3-dimethyl butadiene are useful starting materials. The preferred starting materials are the four carbon hydrocarbons such as butene-1, cis or trans butene-2 and butadiene-1,3 and mixtures thereof. Useful feeds as starting materials may be mixed hydrocarbon streams such as refinery streams. For example, the feed material may be the olefin containing hydrocarbon mixture obtained as the product from the dehydrogenation of hydrocarbons. Another source of feed for the present process is from refinery by-products. For example, in the production of gasoline from higher hydrocarbons by either thermal or catalytic cracking a predominantly $C_4$ hydrocarbon stream may be produced and may comprise a mixture of butenes together with butadiene, butane, isobutane, isobutylene and other ingredients in minor amounts. These and other refinery by-products which contain normal ethylenically unsaturated hydrocarbons are useful as starting materials. Although various mixtures of hydrocarbons are useful, the preferred hydrocarbon feed contains at least 70 weight percent butene-1, butene-2 and/or butadiene-1,3 and mixtures thereof, and more preferably contains at least 95 percent butene-1, butene-2 and/or butadiene-1,3 and mixtures thereof. Any remainder will be aliphatic hydrocarbons.

The gaseous feed stream to the oxidation reactors normally will contain air and about 0.5 to about 2.5 mol percent aliphatic hydrocarbons such as butene. About 1.0 to about 1.5 mol percent of the monoolefin are satisfactory for optimum yield of product for the process of this invention, although higher concentrations may be employed. The source of the oxygen may be pure oxygen or synthetic or natural mixtures of oxygen and inert gases such as nitrogen or helium may be used. Dry air is entirely satisfactory.

As mentioned above, when butene is oxidized to maleic anhydride in vapor phase, many undesirable by-products are produced. For example, weak acids, which are aliphatic monocarboxylic acids of 1 to 4 carbon atoms, are produced. The acid produced in greatest quantity is usually acetic acid, but other acids such as acrylic and crotonic acids are also produced. The carbonyl compounds produced are aliphatic monoaldehydes or 1 to 4 carbon atoms with the principal aldehyde being acrolein together with smaller quantities of acetaldehyde, propionaldehyde and crotonaldehyde. The weak acids and carbonyl compounds are lower utilizing the catalysts of this invention as compared to straight vanadium and phosphorus catalysts.

The dicarboxylic acid anhydrides may be recovered by a number of ways well known to those skilled in the art. For example, the recovery may be by direct condensation or by absorption in suitable media, with subsequent separation and purification of the dicarboxylic acid anhydride.

The maleic anhydride product has many well known commercial uses such as a modifier for alkyd resins.

In the following examples a quantity of 6 mm. x 6 mm. Vycor Raschig rings equivalent to about ¼ to ⅓ of the volume of the catalyst particles was loaded into the reactor on top of the catalyst particles (at the reactor inlet) to act as an inert preheat zone. The amount of catalyst composition coated on the carrier amounted to about 20 weight percent of the total weight of catalyst and carrier. In all of the examples, the percent of the copper and niobium compounds are based on the total weight of $V_2O_5$ and $P_2O_5$ (or equivalent $H_3PO_4$) used. The hydrocarbon feed in all of the examples contained approximately 97 mol percent butene-2 with the remainder being $C_3$ to $C_5$ hydrocarbon impurities. The yields of maleic anhydride are calculated on the weight percent of maleic anhydride formed based on the weight of hydrocarbon fed. Yield values noted represent yields after the yield values had leveled out following the activation period. In all of the examples the butene concentration is based on the combined mols of air and butene.

The examples are only illustrative and are not intended to limit the invention.

EXAMPLE 1

58.5 g. of vanadium pentoxide was added to 7 mols of hydrochloric acid at room temperature. The mixture was refluxed slowly for about 24 hours. A blue solution was obtained. The vanadium had an average valence of less than plus 4.6. 4.2 g. of CuO and 1.8 g. of $Nb_2O_5$ were added, and the solution was refluxed for four hours. The solution was cooled to about 40° C. and 61.6 g. of $P_2O_5$ was cautiously added to the solution and the mixture was refluxed for about 24 hours. The resulting deep blue solution was evaporated to about 250 ml. and the solution was deposited on 480 g. of hydrochloric acid extracted ⅛ inch x ⅛ inch cylindrical Alundum alumina pellets. The carrier particles coated with the complex were then dried at low temperatures to remove the volatiles. A free flowing catalytic material was obtained which had the catalyst complex uniformly deposited on the surface of the Alundum particles. The catalyst particles were then heated at 300° C. in air for a period of about one hour, with the time of heat up to 300° C. being about four hours. The coated Alundum contained 20 weight percent of the catalyst complex based on the weight of the carrier plus complex. The complex which was coated on the carrier had an atomic ratio of 1.0 vanadium, 1.35 phosphorus, 0.082 copper, and 0.021 niobium.

300 ml. of the catalyst were loaded into the bottom of a 3 foot long, ¾ inch I.D. nickel reactor tube surrounded by a salt bath. On top of the catalyst was loaded 100 ml. of 6 mm. x 6 mm. inert Vycor Raschig rings to form a preheat zone. A hydrocarbon mixture containing 95 to 97 mol percent butene-2 together with the remainder being $C_3$ to $C_5$ hydrocarbon impurities was mixed with air to give a mixture containing about 0.7 mol percent butene-2. The mixture of butene and air was fed into the top of the reactor at a rate of 88 g. of butene per liter of catalyst per hour. At a salt bath temperature of 446° C. the yield of maleic anhydride was 84 weight percent based on the weight of butene fed. The maximum temperature in the reactor bed was about 451° C. The effluent from the reactor contained only 3 mol percent aliphatic acids of 2 to 4 carbon atoms, based on the mols of butene fed to the reactor. The maleic anhydride was recovered by bubbling the gaseous stream through water. The acids were determined by analysis of the scrubber water. The acids were determined by titration and the carbonyl compounds were determined by the conventional oxime method. The catalyst had long catalyst life and produced high yields for a prolonged period.

EXAMPLE 2

The general procedure of catalyst preparation and oxidation to maleic anhydride followed in Example 1 was repeated. The catalyst was deposited on HCl extracted $7/16$ inch x $7/16$ inch Alundum alumina cylinders. The catalyst had an atomic ratio of 1.42 phosphorus, 1.0 vanadium and 0.036 copper, 0.0215 niobium and 0.068 lithium (added as $LiOH \cdot H_2O$ to the catalyst solution at the same time as the copper and niobium compounds). A 3 ft. long, ¾ inch I.D. nickel tube reactor was used and was loaded with 300 ml. of the catalyst. A 1.06 mol percent butene-2 in air mixture was fed through the reactor at a rate of 68 grams of butene per liter of catalyst per hour. At a salt bath temperature of 448° C. the yield of maleic anhydride was 87 weight percent based on the butene fed. Lower amounts of weak acids and carbonyls were produced. This catalyst was extremely stable and produced high yields of maleic anhydride for an extended period of time.

I claim:

1. A catalyst useful for vapor phase reactions consisting essentially of a catalytic composition of vanadium, phosphorus, copper, niobium and oxygen deposited on a carrier in an atomic ratio of about 1.1 to 1.8 atoms of phosphorus per atom of vanadium, about 0.005 to 0.3 atom of copper per atom of vanadium, and about 0.005 to 0.25 atom of niobium per atom of vanadium, the said vanadium, phosphorus, copper, oxygen, and niobium constituting at least about 50 weight percent of the catalytic composition.

2. A catalyst consisting essentially of a catalytic composition of vanadium, phosphorus, copper, niobium, oxygen, and a metal of Group Ia of the Periodic Table deposited on a carrier in an atomic ratio of 1.1 to 1.8 atoms of phosphorus per atom of vanadium, 0.005 to 0.3 atom of copper per atom of vanadium and about 0.005 to 0.25 atom of niobium per atom of vanadium, and from 0.003 to 0.2 atom of a metal of Group Ia per atom of phosphorus, the said vanadium, phosphorus, copper, niobium, oxygen, and metals of Group Ia constituting at least 50 weight percent of the catalytic composition.

References Cited

UNITED STATES PATENTS

| | | | |
|---|---|---|---|
| 3,255,212 | 6/1966 | Kerr | 260—346.8 |
| 3,255,313 | 6/1966 | Kerr | 260—346.8 |

DANIEL E. WYMAN, Primary Examiner

P. M. FRENCH, Assistant Examiner

U.S. Cl. X.R.

252—435